(12) United States Patent
Yang et al.

(10) Patent No.: US 9,317,533 B2
(45) Date of Patent: Apr. 19, 2016

(54) ADAPTIVE IMAGE RETRIEVAL DATABASE

(75) Inventors: Linjun Yang, Beijing (CN); Qi Tian, Helotes, TX (US); Bingbing Ni, Singapore (SG)

(73) Assignee: Microsoft Technology Licensing, Inc., Redmond, WA (US)

( * ) Notice: Subject to any disclaimer, the term of this patent is extended or adjusted under 35 U.S.C. 154(b) by 0 days.

(21) Appl. No.: 12/938,310

(22) Filed: Nov. 2, 2010

(65) Prior Publication Data

US 2012/0109943 A1 May 3, 2012

(51) Int. Cl.
*G06F 7/00* (2006.01)
*G06F 17/30* (2006.01)

(52) U.S. Cl.
CPC .... *G06F 17/30277* (2013.01); *G06F 17/30017* (2013.01)

(58) Field of Classification Search
CPC ................................................ G06F 17/30017
USPC ........................................................ 707/781
See application file for complete search history.

(56) References Cited

U.S. PATENT DOCUMENTS

| | | | |
|---|---|---|---|
| 5,574,573 A | 11/1996 | Ray et al. | |
| 6,278,799 B1 | 8/2001 | Hoffman | |
| 6,285,995 B1 | 9/2001 | Abdel-Mottaleb et al. | |
| 6,408,293 B1 | 6/2002 | Aggarwal et al. | |
| 6,594,383 B1 | 7/2003 | Syeda-Mahmood | |
| 6,744,935 B2 | 6/2004 | Choi et al. | |
| 6,847,733 B2 | 1/2005 | Savakis et al. | |
| 7,065,521 B2 | 6/2006 | Li et al. | |
| 7,099,860 B1 | 8/2006 | Liu et al. | |
| 7,113,944 B2 | 9/2006 | Zhang et al. | |
| 7,240,075 B1 | 7/2007 | Nemirofsky et al. | |
| 7,624,337 B2 | 11/2009 | Sull et al. | |
| 7,801,893 B2 * | 9/2010 | Gulli' et al. | 707/737 |
| 2001/0056415 A1 | 12/2001 | Zhu et al. | |
| 2002/0136468 A1 | 9/2002 | Sun | |
| 2004/0111453 A1 | 6/2004 | Harris et al. | |
| 2004/0175041 A1 | 9/2004 | Miller | |

(Continued)

FOREIGN PATENT DOCUMENTS

| | | |
|---|---|---|
| CN | 101198040 | 6/2008 |
| CN | 101751439 | 6/2010 |

(Continued)

OTHER PUBLICATIONS

Bengio, et al., "Group Sparse Coding", retrieved on Jul. 7, 2010 at <<http://books.nips.cc/papers/files/nips22/NIPS2009_0865.pdf>>, MIT Press, Advances in Neural Information Processing Systems (NIPS), 2009, pp. 1-8.

(Continued)

*Primary Examiner* — Ajith Jacob
(74) *Attorney, Agent, or Firm* — Steve Wight; Sandy Swain; Micky Minhas

(57) ABSTRACT

Adaptive image retrieval image allows retrieval of images that are more likely to reflect a current trend of user preferences and/or interests, and therefore can provide relevant results to an image search. Adaptive image retrieval includes receiving image query log data from one or more clients, and updating a codebook of features based on the received query log data. The image query log data includes images that have been queried by the one or more clients within a predetermined period of time.

20 Claims, 6 Drawing Sheets

(56) References Cited

U.S. PATENT DOCUMENTS

| | | | |
|---|---|---|---|
| 2004/0249801 A1* | 12/2004 | Kapur | 707/3 |
| 2005/0057570 A1 | 3/2005 | Cosatto et al. | |
| 2005/0192992 A1 | 9/2005 | Reed et al. | |
| 2006/0077408 A1 | 4/2006 | Amirghodsi | |
| 2006/0112092 A1 | 5/2006 | Ziou et al. | |
| 2007/0104378 A1 | 5/2007 | Aguera Y Arcas | |
| 2007/0214172 A1 | 9/2007 | Nister et al. | |
| 2007/0259318 A1 | 11/2007 | Harrison | |
| 2007/0288453 A1 | 12/2007 | Podilchuk | |
| 2009/0125510 A1 | 5/2009 | Graham et al. | |
| 2009/0171929 A1 | 7/2009 | Jing et al. | |
| 2010/0088342 A1 | 4/2010 | Ji et al. | |
| 2010/0195914 A1* | 8/2010 | Isard et al. | 382/201 |

FOREIGN PATENT DOCUMENTS

| | | |
|---|---|---|
| CN | 101751447 | 6/2010 |
| CN | 101859320 | 10/2010 |
| KR | 100785928 | 12/2007 |
| WO | WO9945483 A1 | 9/1999 |
| WO | WO2006005187 A1 | 1/2006 |

OTHER PUBLICATIONS

Cui, et al., "Combining Stroke-Based and Selection-Based Relevance Feedback for Content-Based Image Retrieval", at <<http://portal.acm.org/citation.cfm?id=1291304#abstract>>, ACM, 2007, pp. 329-332.

Datta, et al., "Image Retrieval: Ideas, Influences, and Trends of the New Age", at <<http://infolab.stanford.edu/~wangz/project/imsearch/review/JOUR/datta.pdf>>, ACM, pp. 65, Apr. 2008.

Jeong, et al., "Automatic Extraction of Semantic Relationships from Images Using Ontologies and SVM Classifiers", Proceedings of the Korean Information Science Society Conference, vol. 34, No. 1(c), Jun. 2006, pp. 13-18.

Kim, et al., "A Hierarchical Grid Feature Representation Framework for Automatic Image Annotation", retrieved on Jul. 7, 2010 at <<http://ieeexplore.ieee.org/stamp/stamp.jsp?tp=&arnumber=4959786>>, IEEE Computer Society, Proceedings of International Conference on Acoustics, Speech and Signal Processing (ICASSP), 2009, pp. 1125-1128.

Kushki, et al., "Query Feedback for Interactive Image Retrieval", at <<http://ieeexplore.ieee.org/xpl/freeabs_all.jsp?arnumber=1294956>>, IEEE, vol. 14, No. 15, May 2004, pp. 644-655.

Magalhaes, et al., "High-Dimensional Visual Vocabularies for Image Retrieval", retrieved on Jul. 7, 2010 at <<http://citeseerx.ist.psu.edu/viewdoc/download?doi=10.1.1.98.7027&rep=rep1&type=pdf>>, ACM, Proceedings of Conference on Research and Development in Information Retrieval, Amsterdam, NL, Jul. 27, 2007, pp. 815-816.

Mairal, et al., "Online Dictionary Learning for Sparse Coding", retrieved on Jul. 7, 2010 at <<http://www.di.ens.fr/~fbach/mairal_icml09.pdf>>, ACM, Proceedings of International Conference on Machine Learning, Montreal, CA, vol. 382, 2009, pp. 1-8.

Qian, et al., "Gaussian Mixture Model for Relevance Feedback in Image Retrieval", at <<http://research.microsoft.com/asia/dload_files/group/mcomputing/2003P/ICME02-1.pdf>>, pp. 4, 2002.

Sclaroff, et al., "Unifying Textual and Visual Cues for Content-Based Image Retrieval on the World Wide Web", at <<http://www.csai.unipa.it/lacascia/papers/cviu99.pdf>>, Academic Press, vol. 75, No. 1/2, Aug. 1999, pp. 86-98.

Yang, et al., "Linear Spatial Pyramid Matching Using Sparse Coding for Image Classification", retrieved on Jul. 7, 2010 at <<http://www.ifp.illinois.edu/~jyang29/papers/CVPR09-ScSPM.pdf>>, IEEE Computer Society, Conference on Computer Vision and Pattern Recognition (CVPR), 2009, Miami, FLA, pp. 1-8.

Zhou., et al., "Unifying Keywords and Visual Contents in Image Retrieval", at <<http://www.ifp.uiuc.edu/~xzhou2/Research/papers/Selected_papers/IEEE_MM.pdf>>, IEEE, 2002, pp. 11.

Extended European Search Report mailed Aug. 11, 2011 for European patent application No. 09755475.2, 9 pages.

Gevers et al., "The PicToSeek WWW Image Search System," Proceedings of the IEEE International Conference on Multimedia Computing and Systems, vol. 1, Jun. 7, 1999, Florence, Italy, pp. 264-269.

Qi et al., "Image Retrieval Using Transaction-Based and SVM-Based Learning in Relevance Feedback Sessions," Image Analysis and Recognition; (Lecture Notes in Computer Science), Aug. 22, 2007, Heidelbert, Berlin, pp. 638-649.

Torres et al., "Semantic Image Retrieval Using Region-Base Relevance Feedback," Adaptive Multimedia Retrieval: User, Context, and Feedback (Lecture Notes in Computer Science; LNCS), Heidelberg, Berlin, 2007, pp. 192-206.

Yang et al., "Learning Image Similarities and Categories from Content Analysis and Relevance Feedback," Proceedings ACM Multimedia 2000 Workshops, Marina Del Rey, CA, Nov. 4, 2000, vol. CONF. 8, pp. 175-178.

Abdel-Mottaleb, et al., "Performance Evaluation of Clustering Algorithms for Scalable Image Retrieval", retrieved on Jul. 30, 2010 at <<http://www.umiacs.umd.edu/~gopal/Publications/cvpr98.pdf>>, John Wiley—IEEE Computer Society, Empirical Evaluation Techniques in Computer Vision, Santa Barbara, CA, 1998, pp. 45-56.

Baumberg, "Reliable Feature Matching Across Widely Separated Views", retrieved on Jul. 30, 2010 at <<http://citeseerx.ist.psu.edu/viewdoc/download?doi=10.1.1.21.1666&rep=rep1&type=pdf>>, IEEE, Proceedings of Conference on Computer Vision and Pattern Recognition (CVPR), Hilton Head Island, SC, vol. 1, 2000, pp. 774-781.

Beckmann, et al., "The R*-Tree: An Efficient and Robust Access Method for Points and Rectangles", retrieved on Jul. 30, 2010 at <<http://epub.ub.uni-muenchen.de/4256/1/31.pdf>>, ACM, SIGMOD Record, vol. 19, No. 2, Jun. 1990, pp. 322-331.

Belussi, et al., "Estimating the Selectivity of Spatial Queries Using the 'Correlation' Fractal Dimension", retrieved on Jul. 30, 2010 at <<http://citeseerx.ist.psu.edu/viewdoc/download?doi=10.1.1.33.4521&rep=rep1&type=pdf>>, Morgan Kaufmann Publishers, Proceedings of International Conference on Very Large Data Bases, 1995, pp. 299-310.

Berchtold, et al., "Fast Parallel Similarity Search in Multimedia Databases", retrieved on Jul. 30, 2010 at <<http://citeseerx.ist.psu.edu/viewdoc/download?doi=10.1.1.72.6847&rep=rep1&type=pdf>>, ACM, Proceedings of International Conference on Management of Data, Tucson, Arizona, 1997, pp. 1-12.

Berchtold, et al., "The X-Tree: An Index Structure for High-Dimensional Data", retrieved on Jul. 30, 2010 at <<http://eref.uqu.edu.sa/files/the_x_tree_an_index_structure_for_high.pdf>>, Morgan Kaufmann Publishers, Proceedings of Conference on Very Large Data Bases, Mumbai, India, 1996, pp. 28-39.

Berg, et al., "Shape Matching and Object Recognition using Low Distortion Correspondences", retrieved on Jul. 30, 2010 at <<http://citeseerx.ist.psu.edu/viewdoc/download?doi=10.1.1.128.1762&rep=rep1&type=pdf>>, IEEE Computer Society, Proceedings of Conference on Computer Vision and Pattern Recognition (CVPR), vol. 1, 2005, pp. 26-33.

Berker, et al., "Very-Large Scale Incremental Clustering", retrieved on Jul. 30, 2010 at <<http://www.google.com/search?q=Berker%2C+Very+Large+Scale+Incremental+Clustering&rls=com.microsoft:en-us:IE-SearchBox&ie=UTF-8&oe=UTF-8& sourceid=ie7&rlz=1I7ADBF>>, Mar. 2007, pp. 1-24.

Can, et al., "Concepts and Effectiveness of the Cover Coefficient Based Clustering Methodology for Text Databases", retrieved on Jul. 30, 2010 at <<http://sc.lib.muohio.edu/bitstream/handle/2374.MIA/

(56) References Cited

OTHER PUBLICATIONS

246/fulltext.pdf?sequence=1>>, Miami University Libraries, Oxford, Ohio, Technical Report MU-SEAS-CSA-1987-002, Dec. 1987, pp. 1-45.

Datar, et al., "Locality-Sensitive Hashing Scheme Based on p-Stable Distributions", retrieved on Jul. 30, 2010 at <<http://www.cs.princeton.edu/courses/archive/spr05/cos598E/bib/p253-datar.pdf>>, ACM, Proceedings of Symposium on Computational Geometry (SCG), Brooklyn, New York, 2004, pp. 253-262.

Faloutsos, et al., "Efficient and Effective Querying by Image Content", retreived on Jul. 30, 2010 at <<http://citeseerx.ist.psu.edu/viewdoc/download?doi=10.1.1.40.9013&rep=rep1&type=pdf>>, Kluwer Academic Publishers, Hingham, MA, Journal of Intelligent Information Systems, vol. 3, No. 3-4, Jul. 1994, pp. 231-262.

Fraundorfer, et al., "Evaluation of local detectors on non-planar scenes", retrieved on Jul. 30, 2010 at <<http://citeseerx.ist.psu.edu/viewdoc/download?doi=10.1.1.59.3077&rep=rep1&type=pdf>>, Proceedings of Workshop of the Austrian Association for Pattern Recognition, 2004, pp. 125-132.

Friedman, et al., "An Algorithm for Finding Best Matches in Logarithmic Expected Time", retrieved on Jun. 29, 2010 at <<http://delivery.acm.org/10.1145/360000/355745/p209-freidman.pdf?key1=355745&key2=3779787721&coll=GUIDE&dl=GUIDE& CFID=93370504&CFTOKEN=86954411>>, ACM Transactions on Mathematical Software, vol. 3, No. 3, Sep. 1977, pp. 209-226.

Furao, et al., "A Self-controlled Incremental Method for Vector Quantization", retrieved on Jul. 3, 2010 at <<http://www.isl.titech.ac.jp/~hasegawalab/papers/shen_prmu_sept_2004.pdf>>, Japan Science and Technology Agency, Journal: IEIC Technical Report, Institute of Electronics, Information and Communication Engineers, vol. 104, No. 290, 2004, pp. 93-100.

Grauman, et al., "The Pyramid Match Kernel: Discriminative Classification with Sets of Image Features", retrieved on Jul. 30, 2010 at <<http://citeseerx.ist.psu.edu/viewdoc/download?doi=10.1.1.100.253&rep=rep1&type=pdf>>, IEEE, Proceedings of International Conference on Computer Vision (ICCV), Beijing, China, Oct. 2005, pp. 1458-1465.

Guttman, "R-Trees: A Dynamic Index Structure for Spatial Searching", retrieved on Jul. 30, 2010 at <<http://citeseerx.ist.psu.edu/viewdoc/download?doi=10.1.1.131.7887&rep=rep1&type=pdf>>, ACM, 1984, pp. 47-57.

He, et al., "An Investigation of Using K-d Tree to Improve Image Retrieval Efficiency", retrieved on Jul. 30, 2010 at <<http://www.aprs.org.au/dicta2002/dicta2002_proceedings/He128.pdf>>, Digital Image Computing Techniques and Application (DICTA), Melbourne, Australia, Jan. 2002, pp. 1-6.

He, et al., "Learning and Inferring a Semantic Space from User's Relevance Feedback for Image Retrieval", retrieved on Jul. 30, 2010 at <<http://research.microsoft.com/pubs/69949/tr-2002-62.doc>>, ACM, Proceedings of International Multimedia Conference, Juan-les-Pins, France, 2002, pp. 343-346.

Henrich, et al., "The LSD Tree: Spatial Access to Multidimensional Point and Non-Point Objects", retrieved on Jul. 30, 2010 at <<http://citeseerx.ist.psu.edu/viewdoc/download?doi=10.1.1.68.9784&rep=rep1&type=pdf>>, Proceedings of the International Conference on Very large Data Bases, Amsterdam, 1989, pp. 45-54.

Indyk, et al., "Approximate Nearest Neighbors: Towards Removing the Curse of Dimensionality", retrieved on Jul. 30, 2010 at <<http://citeseerx.ist.psu.edu/viewdoc/download?doi=10.1.1.38.249&rep=rep1&type=pdf>>, ACM, Proceedings of Symposium on Theory of Computing, Dallas, TX, Apr. 1998, pp. 604-613.

Javidi, et al., "A Semantic Feedback Framework for Image Retrieval", retrieved on Jul. 30, 2010 at <<http://www.ijcee.org/papers/171.pdf>>, International Journal of Computer and Electrical Engineering, vol. 2, No. 3, Jun. 2010, pp. 417-425.

Katayama, et al., "The SR-Tree: An Index Structure for High-Dimensional Nearest Neighbor Queries", retrieved on Jul. 30, 2010 at <<http://citeseerx.ist.psu.edu/viewdoc/download?doi=10.1.1.64.4381&rep=rep1&type=pdf>>, ACM, Proceedings of Internaltional Conference on Management of Data, Tucson, Arizona, 1997, pp. 369-380.

Lepetit, et al., "Randomized Trees for Real-Time Keypoint Recognition", retrieved on Jul. 30, 2010 at <<http://citeseerx.ist.psu.edu/viewdoc/download?doi=10.1.1.92.4902&rep=rep1&type=pdf>>, IEEE Computer Society, Proceedings of Conference on Computer Vision and Pattern Recognition (CVPR), vol. 2, 2005, pp. 775-781.

Li, et al., "An Adaptive Relevance Feedback Image Retrieval Method with Based on Possibilistic Clustering Algorithm", retrieved on Jul. 30, 2010 at <<http://ieeexplore.ieee.org/stamp/stamp.jsp?arnumber=04021676>>, IEEE Computer Society, Proceedings of International Conference on Intelligent Systems Design and Applications (ISDA), 2006, pp. 295-299.

Likas, et al., "The global k-means clustering algorithm", retrieved on Jul. 30, 2010 at <<http://www.cs.uoi.gr/~arly/papers/PR2003.pdf>>, Elsevier Science Ltd., Pattern Recognition, vol. 36, 2003, pp. 451-461.

Linde, et al., "An Algorithm for Vector Quantizer Design", retrieved on Jul. 30, 2010 at <<http://148.204.64.201/paginas%20anexas/voz/articulos%20interesantes/reconocimiento%20de%20voz/cuantificacion%20vectorial/An%20algorithm%20for%20Vector%20Quantizer%20Design.pdf>>, IEEE Transactions on Communications, vol. COM-28, No. 1, Jan. 1980, pp. 84-95.

Lindeberg, et al., "Shape-Adapted Smoothing in Estimation of 3-D Depth Cues from Affine Distortions of Local 2-D Brightness Structure", retrieved on Jul. 30, 2010 at <<http://citeseerx.ist.psu.edu/viewdoc/download?doi=10.1.1.55.5090&rep=rep1&type=pdf>>, Springer-Verlag New York, Proceedings of European Conference on Computer Vision, Stockholm, Sweden, vol. 1, 1994, pp. 389-400.

Lloyd, "Least Squares Quantization in PCM", retrieved on Jul. 30, 2010 at <<http://citeseerx.ist.psu.edu/viewdoc/download;jsessionid=8A3C215650DD1680BE51B35B421D21D7?doi=10.1.1.131.1338&rep=rep1&type=pdf>>, IEEE Transactions on Information Theory, vol. IT-28, No. 2, Mar. 1982, pp. 129-137.

Lowe, "Distinctive Image Features from Scale-Invariant Keypoints", retrieved on Jul. 30, 2010 at <<http://citeseerx.ist.psu.edu/viewdoc/download?doi=10.1.1.157.3843&rep=rep1&type=pdf>>, Kluwer Academic Publishers, Hingham, MA, vol. 60, No. 2, International Journal of Computer Vision, 2004, pp. 91-110.

Matas, et al., "Robust Wide Baseline Stereo from Maximally Stable Extremal Regions", retrieved on Jul. 30, 2010 at <<http://cmp.felk.cvut.cz/~matas/papers/matas-bmvc02.pdf>>, Proceedings of British Machine Vision Conference (BMVC), Cardiff, UK, 2002, pp. 384-393.

Max, "Quantizing for Minimum Distortion", retrieved on Jul. 30, 2010 at <<http://ieeexplore.ieee.org/stamp/stamp.jsp?tp=&arnumber=1057548&userType=inst>>, IEEE Transactions on Information Theory, vol. 6, No. 3, Mar. 1960, pp. 7-12.

Mehrotra, et al., "Feature-Based Retrieval of Similar Shapes", retrieved on Jul. 30, 2010 at <<http://ieeexplore.ieee.org/stamp/stamp.jsp?tp=&arnumber=344072>>, IEEE Computer Society, Proceedings of International Conference on Data Engineering, 1993, pp. 108-115.

Mikolajczyk, et al., "A Comparison of Affine Region Detectors", retrieved on Jul. 30, 2010 at <<http://citeseerx.ist.psu.edu/viewdoc/

(56) References Cited

OTHER PUBLICATIONS download?doi=10.1.1.108.595&rep=rep1&type=pdf>>, Kluwer Academic Publishers Hingham, MA, International Journal of Computer Vision, vol. 65, No. 1-2, 2005, pp. 43-72.

Mikolajczyk, et al., "A performance evaluation of local descriptors", retrieved on Jul. 30, 2010 at <<http://www.ai.mit.edu/courses/6.891/handouts/mikolajczyk_cvpr2003.pdf>>, IEEE Computer Society, Transactions on Pattern Analysis and Machine Intelligence, vol. 27, No. 10, 2005, pp. 1615-1630.

Mikolajczyk, et al., "Scale and Affine Invariant Interest Point Detectors", retrieved on Jul. 30, 2010 at <<http://www.robots.ox.ac.uk/~vgg/research/affine/det_eval_files/mikolajczyk_ijcv2004.pdf>>, Kluwer Academic Publishers, The Netherlands, International Journal of Computer Vision, vol. 60, No. 1, 2004, pp. 63-86.

Murthy, et al., "Content Based Image Retrieval using Hierarchical and K-Means Clustering Techniques", retrieved on Jul. 30, 2010 at <<http://www.ijest.info/docs/IJEST10-02-03-13.pdf>>, International Journal of Engineering Science and Technology, vol. 2, No. 3, 2010, pp. 209-212.

Nister, et al., "Scalable Recognition with a Vocabulary Tree", retrieved on Jul. 30, 2010 at <<http://www.google.com/search?q=Nister%2C+Scalable+Recognition+with+a+Vocabulary+Tree&rls=com.microsoft:en-us:IE-SearchBox&ie=UTF-8&oe=UTF-8&sourceid=ie7&rlz=1I7ADBF>>, IEEE Computer Society, Proceedings of Conference on Computer Vision and Pattern Recognition (CVPR), vol. 2, 2006, pp. 2161-2168.

Obdrzalek, et al., "Sub-linear Indexing for Large Scale Object Recognition", retrieved on Jul. 30, 2010 at <<http://cmp.felk.cvut.cz/~matas/papers/obdrzalek-tree-bmvc05.pdf>>, Proceedings of the British Machine Vision Conference (BMVC), London, UK, vol. 1, Sep. 2005, pp. 1-10.

Patane, et al., "The Enhanced LBG Algorithm", retrieved on Jul. 30, 2010 at <<http://www.google.com.sg/url?sa=t&source=web&cd=1& ved=0CBcQFjAA&url=http%3A%2F%2Fciteseerx.ist.psu.edu%2Fviewdoc%2Fdownload%3Fdoi%3D10.1.1.74.1995%26rep%3Drep1%26type%3Dpdf&rct=j&q=The%20enhanced%20LBG%20algorithm&ei=QXpSTOyFEoyevQOQ35Qa&usg=AFQjCNGkfxm5Kgm4BalKO42_FpgsDADtyw>>, Pergamon, Neural Networks, vol. 14, 2001, pp. 1219-1237.

Rothganger, et al., "3D Object Modeling and Recognition Using Local Affine-Invariant Image Descriptors and Multi-View Spatial Constraints", retrieved on Jul. 30, 2010 at <<http://www-cvr.ai.uiuc.edu/ponce_grp/publication/paper/ijcv04d.pdf>>, Kluwer Academic Publishers Hingham, MA, International Journal of Computer Vision, vol. 66, No. 3, Mar. 2006, pp. 231-259.

Samet, "The Quadtree and Related Hierarchical Data Structure", retrieved on Jul. 30, 2010 at <<http://citeseerx.ist.psu.edu/viewdoc/download?doi=10.1.1.75.5407&rep=rep1&type=pdf>>, ACM, Computing Surveys, vol. 16, No. 2, Jun. 1984, pp. 187-260.

Sawhney, et al., "Efficient Color Histogram Indexing", retrieved on Jul. 30, 2010 at <<http://ieeexplore.ieee.org/stamp/stamp.jsp?tp=&arnumber=413532>>, IEEE, Proceedings of International Conference on Image Processing (ICIP), Austin, TX, vol. 2, Nov. 1994, pp. 66-70.

Schmid, et al., "Evaluation of Interest Point Detectors", retrieved on Jul. 30, 2010 at <<http://cs.gmu.edu/~zduric/cs774/Papers/Schmid-Evaluation-IJCV.pdf>>, Kluwer Academic Publishers, The Netherlands, International Journal of Computer Vision, vol. 37, No. 2, 2000, pp. 151-172.

Sellis, et al., "The R+-Tree: A Dynamic Index for Multidimensional Objects", retrieved on Jul. 30, 2010 at <<http://www.vldb.org/conf/1987/P507.PDF>>, Proceedings of the Conference on Very Large Data Bases, Brighton, 1987, pp. 507-5181.

Sivic, et al., "Video Google: A Text Retrieval Approach to Object Matching in Videos", retrieved on Jul. 30, 2010 at <<http://www.robots.ox.ac.uk/~vgg/publications/papers/sivic03.pdf>>, IEEE Computer Society, Proceedings of International Conference on Computer Vision (ICCV), vol. 2, 2003, pp. 1-8.

Sproull, "Refinements to Nearest-Neighbor Searching in k-Dimensional Trees", retrieved on Jul. 30, 2010 at <<http://www.google.co.in/url?sa=t&source=web&cd=1&ved=0CBUQFjAA&url=http%3A%2F%2Ftrac.astrometry.net%2Fexport%2F13048%2Ftrunk%2Fdocuments%2Fpapers%2Fdstn-review%2Fpapers%2Fsproull1991.pdf&rct=j&q=Refinements%20to%20nearest-%20neighbor%20searching%20in%20k-dimensional%20trees&ei=oXVSTOuFIZO4sQOjoM3RBQ&usg=AFQjCNEP1sD7vWoqQk80zCTpamR2XWSqWg>>, Springer-Verlag NY, Algorithmica, vol. 6, 1991, pp. 579-589.

Tuytelaars, et al., "Matching Widely Separated Views Based on Affine Invariant Regions", retrieved on Jul. 30, 2010 at <<http://www.vis.uky.edu/~dnister/Teaching/CS684Fall2005/tuytelaars_ijcv2004.pdf>>, Kluwer Academic Publishers, The Netherlands, International Journal of Computer Vision, vol. 59, No. 1, 2004, pp. 61-85.

van Rijsbergen, "Information Retrieval", Butterworth-Heinemann, 1979, pp. 1-151.

White, et al., "Similarity Indexing: Algorithms and Performance", retrieved on Jul. 30, 2010 at <<http://citeseerx.ist.psu.edu/viewdoc/download?doi=10.1.1.48.5758&rep=rep1&type=pdf>> Proceedings of Conference on Storage and Retrieval for Image and Video Databases (SPIE), vol. 2670, San Jose, CA, 1996, pp. 62-75.

Yu, et al., "Adaptive Document Clustering", retrieved on Jul. 30, 2010 at <<http://74.125.155.132/scholar?q=cache:nleqYBgXXhMJ:scholar.google.com/&hl=en&as_sdt=2000>>, ACM, Proceedings of International Conference on Research and Development in Information Retrieval, Montreal, Quebec, 1985, pp. 197-203.

Office action for U.S. Appl. No. 12/943,805, mailed on Oct. 11, 2012, Yang et al. "Hierarchical Sparse Representation for Image Retrieval", 6 pages.

Chinese Office Action mailed Dec. 3, 2013 for Chinese Patent Application No. 201110352692.2, a counterpart foreign application of U.S. Appl. No. 12/938,310, 11 pages.

Translated Copy of the Chinese Office Action mailed Jun. 23, 2014 for Chinese patent application No. 201110352692.2, a counterpart foreign application of U.S. Appl. No. 12/938,310, 11 pages.

Translated Copy of the Chinese Office Action mailed Dec. 22, 2014 for Chinese patent application No. 201110352692.2, a counterpart foreign application of U.S. Appl. No. 12/938,310, 7 pages.

Office action for U.S. Appl. No. 12/938,310, mailed on Sep. 11, 2014, Yang et al, "Adaptive Image Retrieval Database", 14 pages.

\* cited by examiner

ADAPTIVE IMAGE RETRIEVAL DATABASE

BACKGROUND

Along with the development of Internet technology, search engines such as Bing®, Google® and Yahoo® currently provide text-based image search services to internet users. These image search services allow a user entering a keyword to describe an image the user wants to find, and retrieve one or more database images based on the entered keyword. In order to retrieve the desired image however, the entered keyword needs to describe the image accurately and/or sufficiently. Furthermore, this type of image search requires a database image to have one or more textual annotations in order to allow comparison and retrieval of that particular database image. Given that millions of images exist on the Internet, this unavoidably places a tremendous workload on the search engines. Moreover, the images must be accurately and completely tagged with the textual annotations in order for the images to be discovered using a text search query.

In view of the deficiencies of the text-based image search, some search engines now provide content-based image retrieval (CBIR) services. A user submits a query image to the search engine, which then analyzes the actual contents (e.g., colors, shapes and textures) of the query image. Based on a result of the analysis, the search engine retrieves images that are similar to or related to the query image. However, this type of content-based image retrieval is still in an immature stage. Research is actively conducted to determine effective and accurate image search and retrieval strategies and/or algorithms. In addition, the current state-of-the-art content-based image retrieval method is data-centric rather than user-centric. For example, existing image retrieval systems do not consider users' bias.

SUMMARY

This summary introduces simplified concepts of an adaptive image retrieval system, which is further described below in the Detailed Description. This summary is not intended to identify essential features of the claimed subject matter, nor is it intended for use in determining the scope of the claimed subject matter.

This application describes example embodiments of adaptive image retrieval. In one embodiment, an adaptive image retrieval system receives image query log data from one or more clients. The image query log data includes images that have been queried or submitted for query by the one or more clients within a predetermined period of time. The system updates a codebook of features based at least on this received query log data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
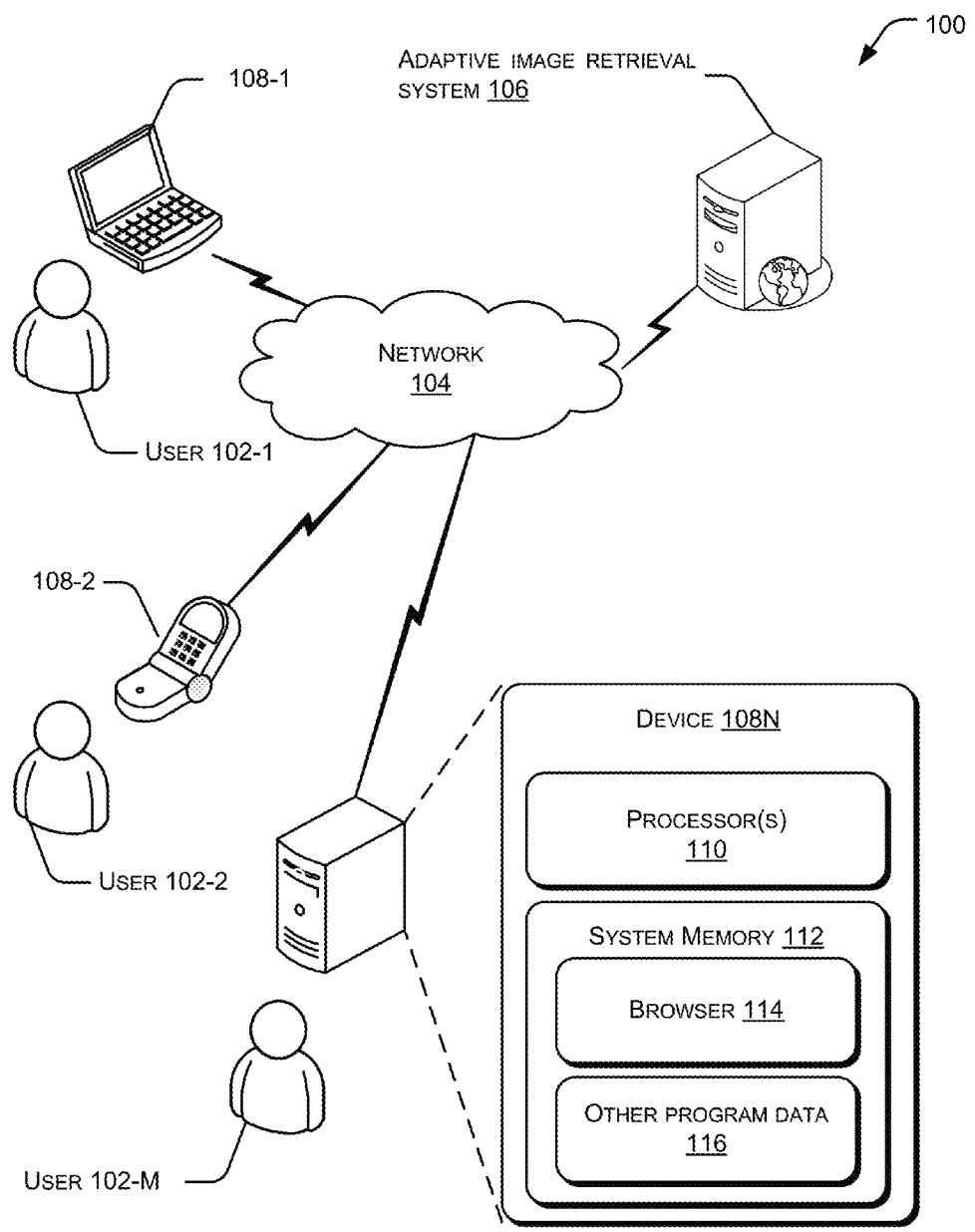
FIG. 1 illustrates an exemplary environment including an example adaptive image retrieval system.

As noted above, the current state-of-the-art CBIR system does not consider users' bias, and return images that fail to reflect the current trend of users' preferences and/or interests. The systems retrieve images without considering that some images are more frequently queried by users while other images may be seldom or rarely accessed. Furthermore, user preferences and interests are changing over time. Images that were interesting to the users in the past may not be interesting now. Moreover, image queries, which are novel and new, may not have been incorporated in the construction of image search/retrieval algorithms. A typical example is an image query regarding automobiles. Most users, for example, may be interested in new car models. If a user submits a query image including a car, the search engine needs to be aware that the user may probably want to obtain images of new car models, instead of the old ones. In short, the state-of-the-art image search fails to satisfy and reflect this trend of user preferences and/or interests. This often results in returning images that, though similar to the query images, are not desired by the users.

This disclosure describes adaptive image retrieval, which incorporates image query log data into search strategies and/or algorithms, and facilitates retrieval of images that reflect users' current preferences and interests.

Generally, an adaptive image retrieval system receives image query log data from one or more clients. This image query log data may include a plurality of query images that have been previously submitted by the one or more clients. Based on the log data, the system updates or reconstructs its search strategies and/or algorithms to facilitate retrieval of images that more likely to be more relevant to the clients' current interests. For example, if the system employs a codebook of features for identifying and retrieving images, this codebook of features may be reconstructed based on the received image query log data. The resulting features of the reconstructed codebook are then biased towards the features that are representative of images recently queried by the users. Additionally or alternatively, an image dissimilarity metric may be updated based on the image query log data so that features of the reconstructed codebook are then biased against features that are unlike features of images recently queried by the users. Put differently, the adaptive image retrieval system may be configured to increase a likelihood that images having features similar to images recently queried by the user will be returned and/or to decrease a likelihood that images having features dissimilar to images recently queried by the user will be returned as search results.

The described system allows image retrieval to reflect the trend of user preferences and/or interests, and therefore reduces frustration encountered by users when irrelevant images, though similar to a query image, are returned to the users.

Multiple and varied implementations and embodiments are described below. In the following section, an exemplary environment that is suitable for practicing various implementations is described. After this discussion, illustrative implementations of systems, devices, and processes for adaptive image retrieval system are described.

Exemplary Architecture

FIG. 1 illustrates an exemplary environment 100 usable to implement an adaptive image retrieval system. The environment 100 includes one or more users 102-1, 102-2, ... 102-M (which are collectively referred to as 102), a network 104 and an adaptive image retrieval system 106. The user 102 communicates with the adaptive image retrieval system 106 through the network 104 using one or more devices 108-1, 108-2, ... 108-N, which are collectively referred to as 108.

The device 108 may be implemented as a variety of conventional computing devices including, for example, a server, a desktop PC, a notebook or portable computer, a workstation, a mainframe computer, a mobile computing device, a handheld device, a mobile phone, an Internet appliance, a network router, etc. or a combination thereof.

The network 104 may be a wireless or a wired network, or a combination thereof. The network 104 may be a collection of individual networks interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

In one embodiment, the device 108 includes a processor 110 coupled to a memory 112. The memory 112 includes a browser 114 and other program data 116. The memory 112 may be coupled to or associated with, and/or accessible to other devices, such as network servers, router, and/or other devices 108.

In one embodiment, the user 102 uses the browser 114 of the device 108 to submit an image query to the adaptive image retrieval system 106. Upon retrieving one or more relevant images for the image query, the adaptive image retrieval system 106 returns relevant images to the user 102.

Figure 2:
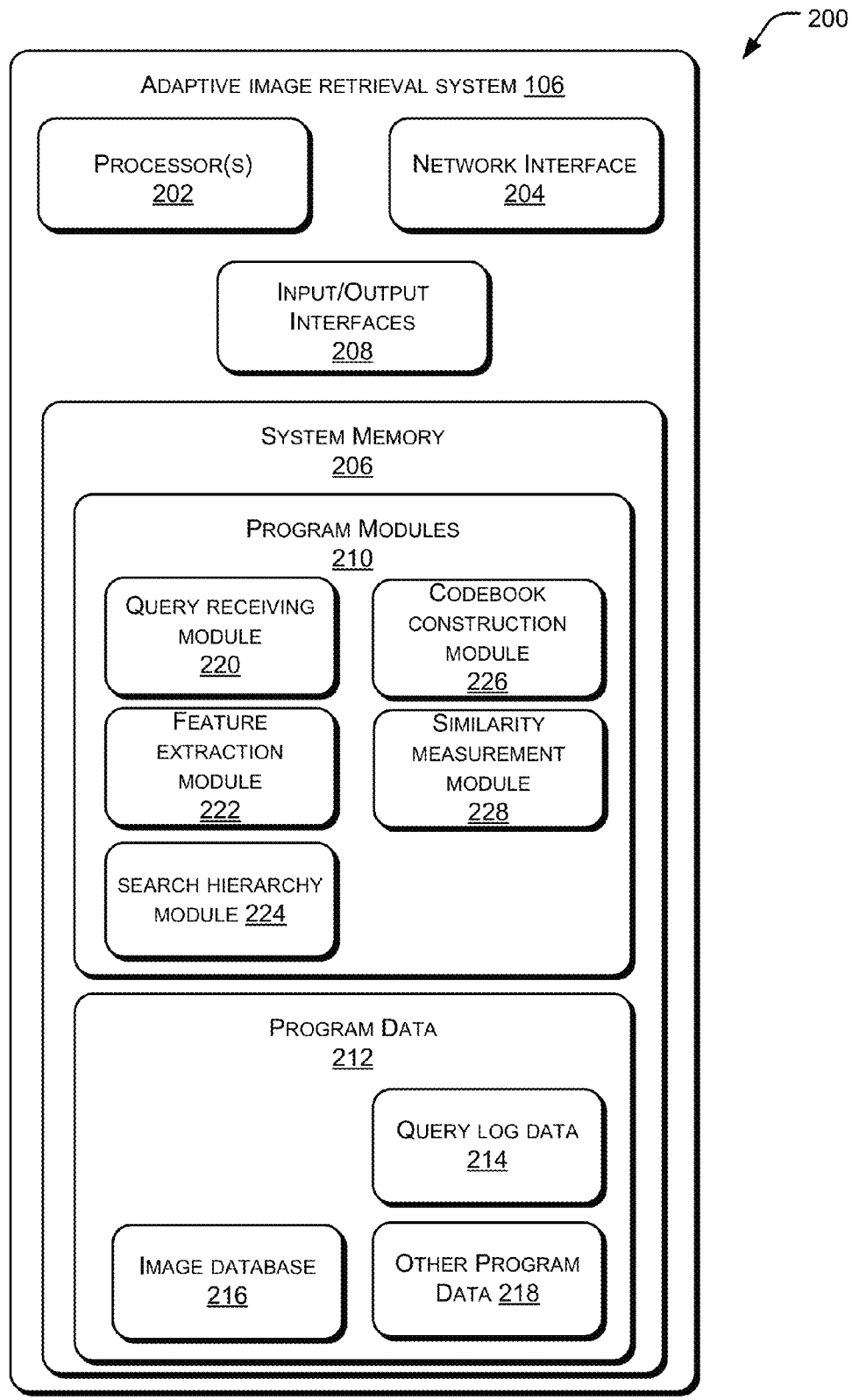
FIG. 2 illustrates the example adaptive image retrieval system of FIG. 1 in more detail.

FIG. 2 illustrates the adaptive image retrieval system 106 in more detail. In one embodiment, the system 106 can include, but is not limited to, a processor 202, a network interface 204, a system memory 206, and an input/output interface 208.

The memory 206 includes a computer-readable media in the form of volatile memory, such as Random Access Memory (RAM) and/or non-volatile memory, such as read only memory (ROM) or flash RAM. The memory 206 includes program modules 210 and program data 212. The memory 206 is one example of computer-readable storage media. The program data 212 may include image query log data 214, an image database 216, and other program data 218. Although the image database 216 is described herein to be included in the memory 206 of the system 106, the image database 216 may alternatively be separate from and accessible by the system 106. The image query log data 214 may be collected directly from one or more clients. Additionally or alternatively, the image query log data 214 may be collected or gathered from one or more other systems 106 or search engines (not shown). This image query log data 214 may include a plurality of images collected within a predetermined period of time, which may be one day, one week, or one month, for example. In one embodiment, the plurality of images may include images that have been queried or submitted for query by one or more clients 102. In another embodiment, the plurality of images may further include database images that have been returned to the one or more clients 102 in response to respective image queries. Additionally or alternatively, the plurality of images may include those returned database images that have actually been selected by the one or more clients 102. In an event that the plurality of images include the selected database images, the image query log data 214 may further include respective similarity scores of the selected database images. A similarity score of a selected database image represents a relative resemblance of the selected database image with respect to corresponding query image, which is based on, for example, similarity between features of the selected database image and features of corresponding query image. For example, a relative resemblance of a first image with respect to a second image may be based on a ratio of the number of features that are common for the first and second images with respect to an average number of features of the two images. The image query log data 214 may further include respective query frequencies of the plurality of images collected within the predetermined period of time. Additionally or alternatively, the image query log data 214 may further include respective query times of the plurality of images collected within the predetermined period of time. In one embodiment, the image query log data 214 may further include information of the one or more clients who have submitted the plurality of images. The information of a client may include, but is not limited to, identification information of the client, and information of a computing device used by the client to submit the image query. In an event that personal information about the client is collected, the client may be given an opportunity to opt out of sharing such information as personally identifiable information. Furthermore, rather than storing the actual images in the image query log data 214, pointers, indices or hash values of the actual images that are stored in the image database 216 may be stored in the image query log data 214 instead.

The program module 210 may include a query receiving module 220. The query receiving module 220 receives an image query from a client. The image query includes a query image that the client uses to find his/her desired image(s). Upon receiving the image query, the query receiving module 220 may record the received query image into the image query log data 214, together with additional information such as corresponding query time. Alternatively, the query receiving module 220 may wait until a predetermined record time is reached, and record all query images together with respective additional information into the image query log data 214 obtained within that predetermined record time. The query receiving module 220 may further transfer the query image to a feature extraction module 222, which extracts features that are representative of the query image. The feature extraction module 222 may adopt one or more feature extraction techniques such as singular vector decomposition (SVD), Bag of Visual Words (BoW), etc. Examples of the features include, but are not limited to, scale-invariant feature transform (SIFT), and intensity histogram.

Depending on which mode the system 200 is performing, the extracted features may either be fed to a search hierarchy module 224, a codebook reconstruction module 226, a similarity measurement module 228, or any combination thereof.

In one embodiment, in response to receiving the extracted features from the feature extraction module 222, the search hierarchy module 224 compares the extracted features with an existing codebook of features. A codebook of features, sometimes called a codebook of visual words, may be generated, for example, by clustering image features into a plurality of clusters. A feature or visual word of the codebook may be defined to be, for example, a center of one of the plurality of clusters. Under this type of codebook construction, an image may be represented in terms of a histogram of occurrences of visual words/features by assigning each extracted feature to its nearest cluster center. Upon assigning each extracted feature to one of the visual words of the codebook, these assigned visual words may be compared with visual words of each database image according to an image similarity metric. The image similarity metric is a measure of similarity between two images, and may return a similarity/dissimilarity score to represent a relative resemblance of a database image with respect to the query image. In one embodiment, the similarity measurement module 228 calculates a similarity/dissimilarity score of a database image with respect to the query image based upon the extracted features or assigned visual words. For example, the similarity measurement module 228 calculates the similarity/dissimilarity score based on a ratio of the number of common features or visual words of the query image and the database image with respect to their average number of features or visual words.

In another embodiment, rather than comparing with visual words of each database image, the similarity measurement module 228 may compare the assigned visual words with representative visual words of each image class (e.g., an automobile class), with each image class comprising a plurality of database images that share a predetermined number or percentage of common visual words. This predetermined number or percentage of common visual words can be set by an administrator or operator of the system 106.

In still another embodiment, the similarity measurement module 228 may employ a search hierarchical structure having multiple levels. Each level of the search hierarchical structure may include n number of nodes, where n can be any integer greater than zero. Each node of the search hierarchical structure has a representative set of visual features.

In one embodiment, the representative set of visual features of a node may be a cluster center of visual words of all images belonging to the node and child nodes thereof. The extracted features or the assigned visual words may be compared with the representative set of visual features of each node at one level. Upon finding a node having the closest set of visual features with respect to the extracted features or the assigned visual words at that level, corresponding one or more child nodes at next level are compared, and so forth, until a leaf node is reached. One or more database images that are associated with this leaf node may then be returned to the client as a result for the image query. Furthermore, the similarity measurement module 228 may obtain one or more similarity/dissimilarity scores of these database images with respect to the query image. The returned result of the image query may have the one or more database images arranged according to their similarity/dissimilarity scores, for example, in a descending order of their similarity scores/dissimilarity scores. Although being described as separate modules, the search hierarchy module 224 and the similarity measurement module 228 may be considered as a single module to perform all the above described operations thereof.

When the image search/retrieval strategy or algorithm of the system 106 is updated or reconstructed, the image similarity metric, the codebook of features, or both may be updated or reconstructed. In one embodiment, the image search or retrieval strategy or algorithm of the system 106 may be updated or reconstructed on a regular basis, e.g., each day, each week, each month or each year. In another embodiment, the image search/retrieval strategy or algorithm of the system 106 may be updated or reconstructed in response to the number of images in the image query log data reaching a predetermined number threshold. The predetermined number threshold may be set at a certain percentage (e.g., 1%) of the total number of images in the image database 216, or at an absolute value (e.g., 1000 images). In still another embodiment, the image search or retrieval strategy or algorithm of the system 106 may be updated or reconstructed in response to an average of the similarity scores (i.e., an average similarity score) of all selected database images in the image query log data 214 being less than a predetermined similarity score threshold. Alternatively, the image search or retrieval strategy or algorithm of the system 106 may be updated or reconstructed in response to an average of the dissimilarity scores of all selected database images in the image query log data 214 being greater than a predetermined dissimilarity score threshold. For example, if a perfect match between a query image and a database image has a similarity score of one or a dissimilarity score of zero, the codebook may be updated or reconstructed in response to the average similarity score being less than 0.7 or the average dissimilarity score being greater than 0.3, for example. Alternatively, the above three strategies may be combined, and the image search/retrieval strategy or algorithm updated or reconstructed whenever one of the above predetermined time or threshold is reached, or when both are reached. It should be noted that the above values of time, percentage and score are used for illustrative purpose only. Any values can be used and set by an administrator or operator of the system 106 according to the accuracy and/or computing requirements, for example.

Two exemplary update/reconstruction algorithms are described as follows. The described update/reconstruction algorithms increase a likelihood of retrieving a feature of a first queried image having a first query frequency relative to a feature of a second queried image having a second query frequency, which is lower than the first query frequency. However, the following update/reconstruction algorithms are used for illustrative purposes only. The current disclosure covers any algorithm that incorporates the image query log data into update/reconstruction of image search/retrieval strategy or algorithm.

Example Image Similarity Metric

One purpose of this algorithm is to incorporate the users' behavior information from the image query log data into the visual word weighting framework. Intuitively, a more frequently visited visual word (from the image queries) will have a higher weight, increasing a likelihood of retrieving those database images having the more frequently visited visual word. More specifically, a uniformed probabilistic framework is formulated based on query-log based weighting and conventional tf-idf weighting scheme. From the points of view of both users' preferences and data distribution, a query-log related component and a term frequency component may be regarded to be complementary prior information. A term frequency of a visual word is defined to be the number of times the visual word appears in an image. By marginalizing each term frequency with respect to database images and image classes, a query-log related prior probability for each visual word is obtained and serves as an important weight for re-weighting each visual word. This new visual word importance weighting scheme is defined as qf-tf-idf (where qf denotes the query frequency), and could serve as an important building block for a user-concentric CBIR system.

For the sake of description, some notations are first defined herein. Let an image collection be denoted as D and the i-th image be represented as $I_i$. The size of the image collection, i.e., the number of images, is assumed to be $N=|D|$. The number of image classes (or concepts) in the image database is assumed to be K. A set or codebook of visual words (V) are generated by clustering (e.g., K-means clustering), which are denoted as $V_1, V_2, \ldots V_M$, where M is the size of the codebook.

In the conventional tf-idf framework, a term frequency $n_i^j$ in the j-th image is denoted as the number of times a given visual word $V_i$ appears in that image. This frequency is usually normalized to prevent an unbalanced number of features or visual words (e.g., SIFT features) extracted from each image. Thus a normalized term frequency is calculated as:

$$tf_i^j = \frac{n_i^j}{\sum_i n_i^j} \quad (1)$$

where the denominator is the sum of number of occurrences of all visual words in the j-th image.

To reflect the general importance of each term or visual word, an inverse document frequency of a visual word is obtained by taking the logarithm of a quotient between the total number of all database images N and the number of images including the visual word, and is defined as:

$$idf_i = \log \frac{N}{|\{I : V_i \in I\}|} \quad (2)$$

where $|\{I: V_i \in I\}|$ is the number of images where the visual word $V_i$ appears. The inverse document frequencies hence tend to filter out those visual words commonly shared by all images, which are less informative.

To measure a dissimilarity between two images, a $L^P$-norm that is weighted by the inverse document frequency may be used, and denoted as:

$$d(I_1, I_1) = \Sigma_i |tf_i^1 - tf_i^2|_{L^P} \times idf_i \quad (3)$$

In practice, p is usually set to be one or two. By way of example, p is set to be one herein.

From a probabilistic point of view, an inverse document frequency weight $\omega_D$ could be considered as a prior distribution of the visual word, conditioned on the database images, and could be re-written as:

$$\omega_D \sim p(v|D) = \Pi_i p(V_i|D) \quad (4)$$

$$p(V_i|D) \sim idf_i \quad (5)$$

The distribution of each visual word is assumed to be independent with respect to the database images herein.

This prior information is only based upon the intrinsic image data distributions. However, given that the users' query log data 214 is available, the prior distribution of each visual word will be not only conditioned on the collection of the database images in the image database 216, but also on the query log data 214. These two resources construct the two important and complementary aspects of the prior information on the distribution of visual words, namely, the data domain and the user domain respectively. Therefore, the prior distribution of the visual words could be defined in terms of both the collection of database images and the query log data 214, namely, $p(V_i|D,Q)$, where Q represents the query log set of the query log data 214. Assuming that the query log data 214 and the image collection information are independent, the prior distribution may further be divided into two terms:

$$p(v|D,Q) \sim p(v|D) \times p(v|Q) = \Pi_i p(V_i|D) \times \Pi_i p(V_i|Q) \quad (6)$$

where independence of each visual word $V_i$ is assumed herein.

$p(V_i|Q)$ denotes a prior probability of visual word $V_i$ given query log information of the users. This prior probability measures the importance of the visual word in terms of the users' favors and preferences information, and could serve as a new user-concentric importance weight, denoted as $\omega_Q$ in that:

$$\omega_Q \sim p(v|Q) = \Pi_i p(V_i|Q) \quad (7)$$

where independence of each visual word $V_i$ is assumed as before.

The term $p(V_i|Q)$ may be further decomposed into:

$$p(V_i | Q) = \sum_{j=1}^{N} \sum_{k=1}^{K} p(V_i | Q, I_j, k) p(k | I_j, Q) p(I_j | Q) \quad (8)$$

$$= \sum_{j=1}^{N} \sum_{k=1}^{K} p(V_i | k) p(k | I_j) p(I_j | Q)$$

Given the query log information of the users, $p(I_j|Q)$ measures the prior probability of the database images, and is defined as:

$$p(I_j | Q) = \frac{qf_j}{\sum_i qf_j} \quad (9)$$

which is a normalized frequency value that measures how often the image $I_j$ is used as a query image. The higher value of $p(I_j|Q)$ indicates that the image $I_j$ is more interesting to the users, and hence corresponding visual words of the image $I_j$ should receive more weights. It should be noted that $$\Sigma_j^N p(I_j|Q) = 1 \quad (10)$$

$p(k|I_j)$ refers to the probability that the image $I_j$ belongs to the k-th image class (or concept). If each database image is assumed to have a single label, $p(k|I_j)$ could be further defined as:

$$\begin{cases} p(k | I_j) = 1, & \text{if } I_j \in S_k \\ p(k | I_j) = 0, & \text{else} \end{cases} \quad (11)$$

Here, $S_k$ denotes the subset of the images belonging to the k-th image class. Similarly, the add-to-one constraint applies:

$$\Sigma_{k=1}^{K} p(k|I_j) = 1 \quad (12)$$

$p(V_i|k)$ refers to the likelihood that the visual word $V_i$ appears in the images that belong to the k-th image class, and is defined as:

$$p(V_i | k) = \frac{c_k^i}{\sum_{i=1}^{M} c_k^i} \quad (13)$$

$$c_k^i = |\{I : V_i \in I, I \in S_k\}| \quad (14)$$

As can be noted above, $p(V_i|k)$ measures the importance of the visual word $V_i$ for the class k, and those visual words that are shared by more images from the k-th image class will take higher $p(V_i|k)$ values. Also, it should be noted that:

$$\Sigma_{i=1}^{M} p(V_i|k) = 1 \quad (15)$$

It is noted that the above three terms $p(I_j|Q)$, $p(k|I_j)$, and $p(V_i|k)$ work in a cooperative manner that propagate the importance of each image (from query frequency) into the specified visual words that belong to certain image classes. In this way, not only the interesting image but also other images within the same image class contribute to the weights of the visual words that frequently occur inside the same image class. In other words, the importance of the interesting images are propagated into the other images that belong to the same image class. This generality property is particularly important for the system 106 to deal with unseen images. On the contrary, those visual words which either appear randomly inside the same image class or receives little importance from only uninteresting images will finally get low weights. These features (visual words) could be regarded as spurious features.

$p(V_i|Q)$ is used herein to define the proposed query frequency based weight, i.e., $qf_i=p(V_i|Q)$. Combining the inverse document frequency weight defined above, a new image dissimilar metric between two images could be defined as:

$$d(I_1,I_1)=\Sigma_i|tf_i^1-tf_i^2|_{L^p}\times idf_i\times qf_i \qquad (16)$$

Figure 3:
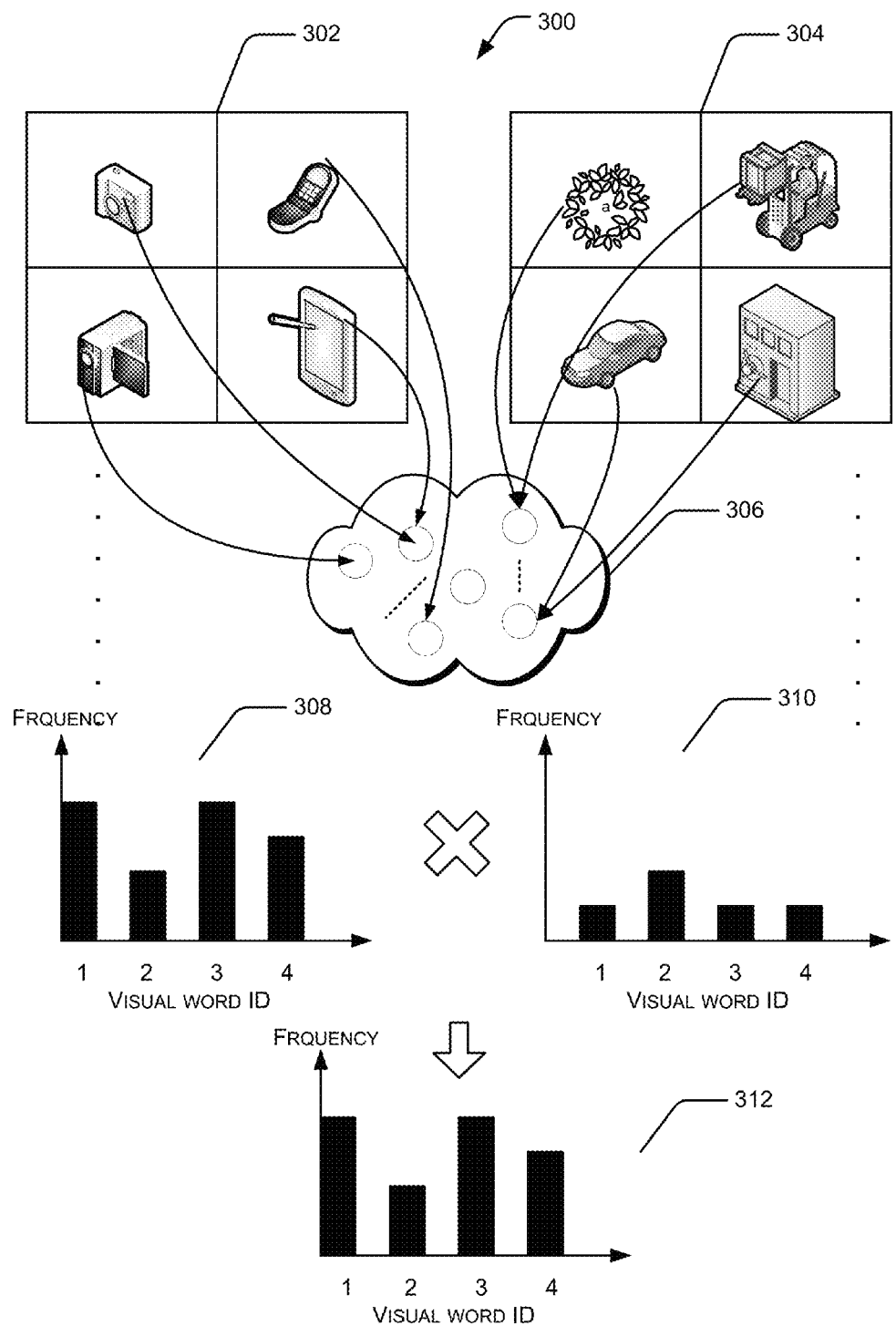
FIG. 3 illustrates an exemplary method of updating an image search/retrieval algorithm based on image query log data.

FIG. 3 shows an illustration of the qf-tf-idf visual word weighting scheme 300. The upper row of FIG. 3 includes frequently queried images 302 and less frequently queried images 304. The middle row of FIG. 3 includes visual vocabulary 306, query frequency based weights 308 and inverse document frequency based weights 310 for visual words 1-4, for example. The last row shows combined weights 312 for image dissimilarity metric after combining both types of weights.

The above qf-tf-idf weighting scheme provides a number of advantages. For example, this scheme is a user-centric and directly aims at improving satisfaction level of the users. Moreover, due to its relative simplicity, the proposed qf-tf-idf weighting scheme is efficient and could seamlessly adopt statistics of users' favor information as a building block for CBIR system. Furthermore, being defined in a probabilistic framework, the proposed qf-tf-idf weighting scheme is robust and effective.

Example Update or Reconstruction of a Codebook of Features

Another method to incorporate the image query log data 214 into the image search/retrieval algorithm is to update or reconstruct the existing codebook of features used in the system 106. For example, the codebook of features/visual words may be generated by clustering. In this case, the codebook can be updated or reconstructed by re-weighing images or extracted features of the images using information of the image query log data 214 (e.g., query frequencies) in a clustering cost function so that newly formed clusters (or visual words) will bias towards those frequently queried images or image features. After clustering, the new clusters may be checked, and any cluster having very low query frequency accumulation (i.e., sum of all query frequencies of images or image features with the cluster) may be removed. Alternatively, not every cluster (or visual word) of the codebook needs to be involved or changed during an update. In order to reduce computing workload, one may only update a cluster to which at least one extracted feature of a query image in the image query log data 214 belongs, while leaving other clusters untouched. The new codebook or the weights within the codebook may then be normalized in the update, or in response to being updated a predetermined number of times. Such deferred normalization of the weights may be preferable if the number of images or image features is tremendous. Normalization of the codebook may be done by rescaling the weights of the features of the codebook by a scale factor. This scale factor may be determined such that a sum of all the weights of the features of the codebook will be equal to a certain value, one, for example.

Alternative Embodiments

Although the above algorithms incorporate query frequencies of the plurality of images in the image query log data 214 to update the image dissimilarity metric and/or codebook of features, the present disclosure is not limited thereto. In one embodiment, respective query times of the plurality of images may be incorporated into the search/retrieval algorithm. Under this algorithm, the system 106 will increase a likelihood of retrieving a feature of a first queried image having a first query time relative to a feature of a second queried image having a second query time, where the first query time is prior to the first query time.

Additionally or alternatively, the described image retrieval system may allow images queried by different users to carry different weights or levels of importance with respect to updating or reconstructing the codebook. For example, a website or a search engine may require membership to use its image search service. The membership may include, for example, a guest membership, an ordinary membership, and a premier membership. The website or the search engine may further require members of different types to pay monthly membership fees, e.g., free for a guest member, ten dollars for an ordinary member, and fifty dollars for a premier member. Because of different levels of revenue generated from different types of membership, the website or the search engine may preferably serve a premier member than a guest member, for example. By allowing images queried by a premier member to have a higher weight or level of importance, for example, the image retrieval system 106 may increase a likelihood of retrieving a database image that the premier member desires. In this case, the image query log data 214 may further include information (e.g., cookies of devices used) of users of the website or the search engine.

In another embodiment, the adaptive image retrieval system 106 may further incorporate text-based image search with the described algorithms. For example, a user may provide a query image and a keyword describing the query image. The adaptive image retrieval system 106 may then retrieve one or more database images that are relevant to the query image and the keyword. The adaptive image retrieval system 106 may further return a database image having found to be relevant to the query image and tagged with the keyword or the like to the user in a higher ranking position than another database image without keyword tagging.

Exemplary Methods

Exemplary methods for updating a codebook of features are described with reference to FIGS. 1-3. These exemplary methods can be described in the general context of computer executable instructions. Generally, computer executable instructions can include routines, programs, objects, components, data structures, procedures, modules, functions, and the like that perform particular functions or implement particular abstract data types. The methods can also be practiced in a distributed computing environment where functions are performed by remote processing devices that are linked through a communication network. In a distributed computing environment, computer executable instructions may be located both in local and remote computer storage media, including memory storage devices.

The exemplary methods are illustrated as a collection of blocks in a logical flow graph representing a sequence of operations that can be implemented in hardware, software, firmware, or a combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described herein. In the context of software, the blocks represent computer instructions that, when executed by one or more processors, perform the recited operations.

Figure 4:
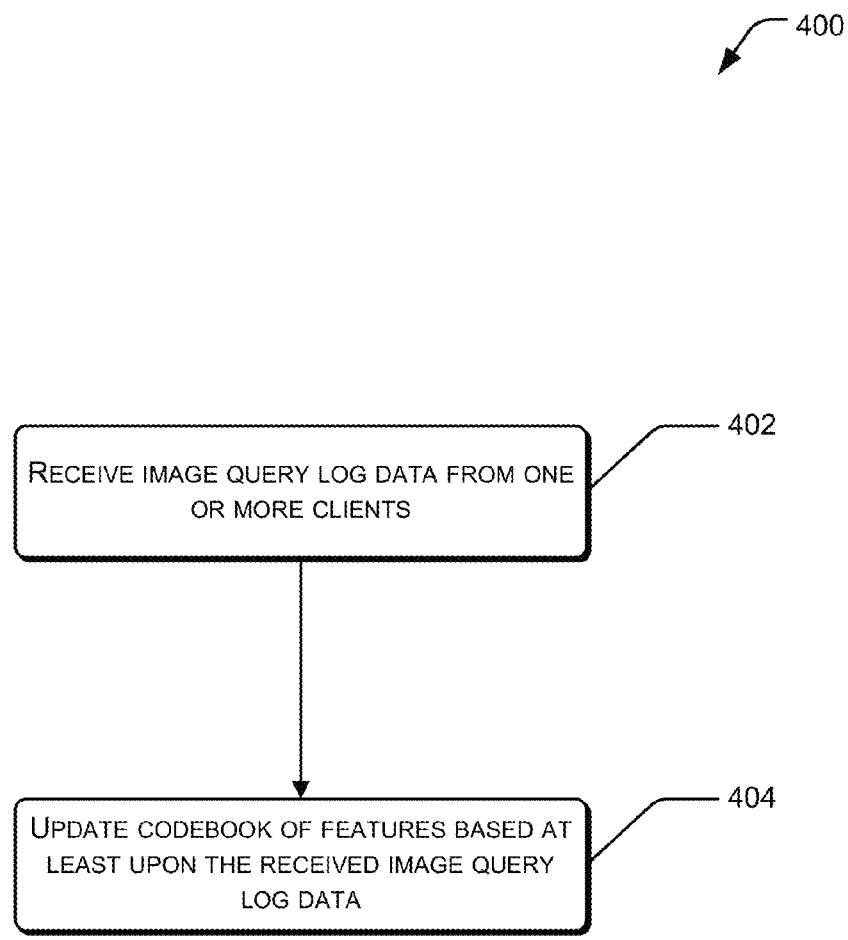
FIG. 4 illustrates a first exemplary method of retrieving one or more database images in response to an image query submitted by a client.

FIG. 4 illustrates a first exemplary method 400 of updating a codebook of features.

At block 402, image query log data is received from one or more clients. The image query log data includes at least a plurality of images that have been queried by the one or more clients within a predetermined period of time.

At block 404, a codebook of features is updated based on the received query log data.

Figure 5:
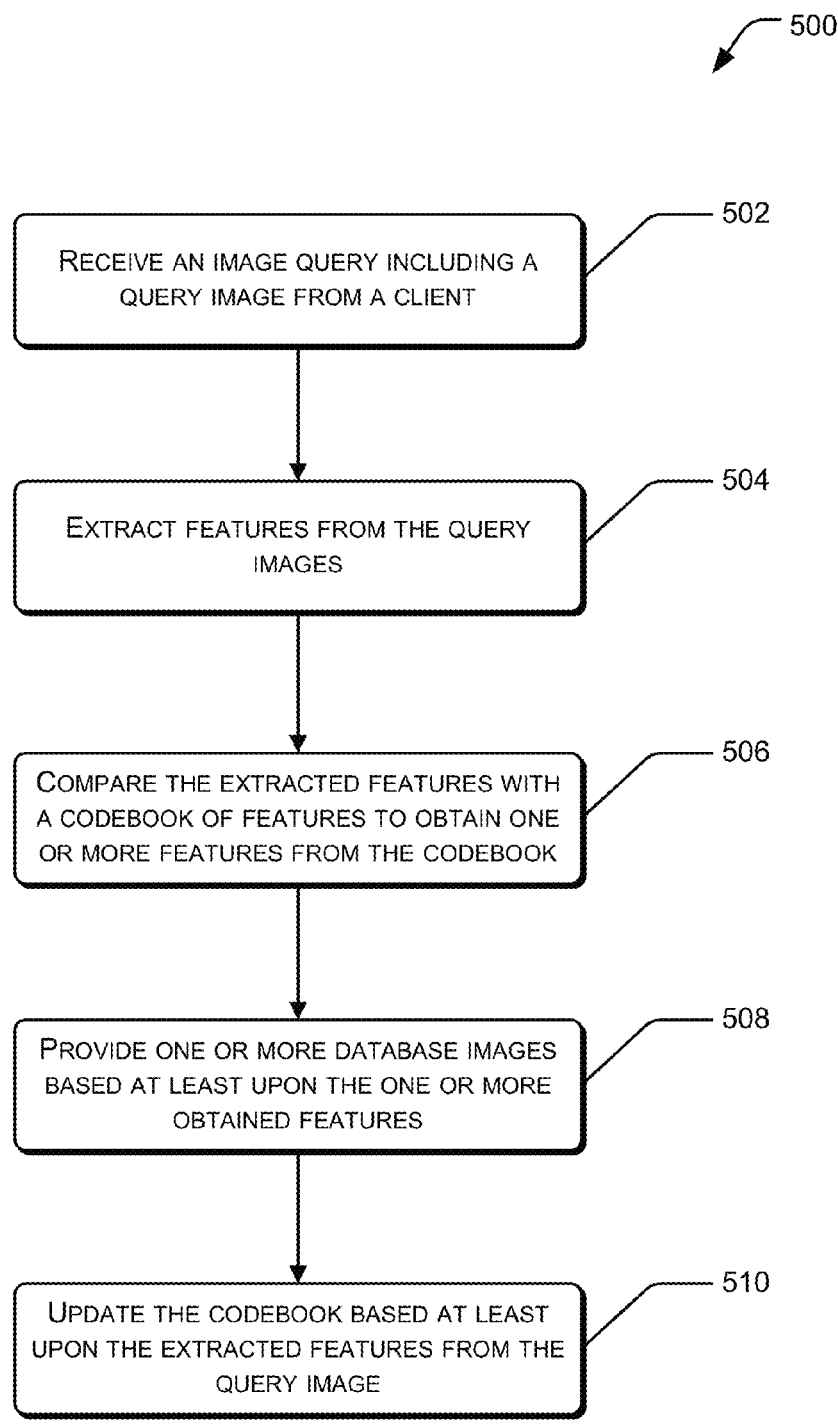
FIG. 5 illustrates a second exemplary method of retrieving one or more database images in response to an image query submitted by a client.

FIG. 5 illustrates a second exemplary method 500 of updating a codebook of features.

At block 502, an image query including a query image is received from a client.

At block 504, a plurality of features are extracted from the query image.

At block 506, the plurality of extracted features are compared with a codebook of features to obtain one or more features from the codebook.

At block 508, one or more database images are provided to the client based at least upon the one or more obtained features.

At block 510, the codebook of features is updated based at least upon the plurality of extracted features from the query image.

Figure 6:
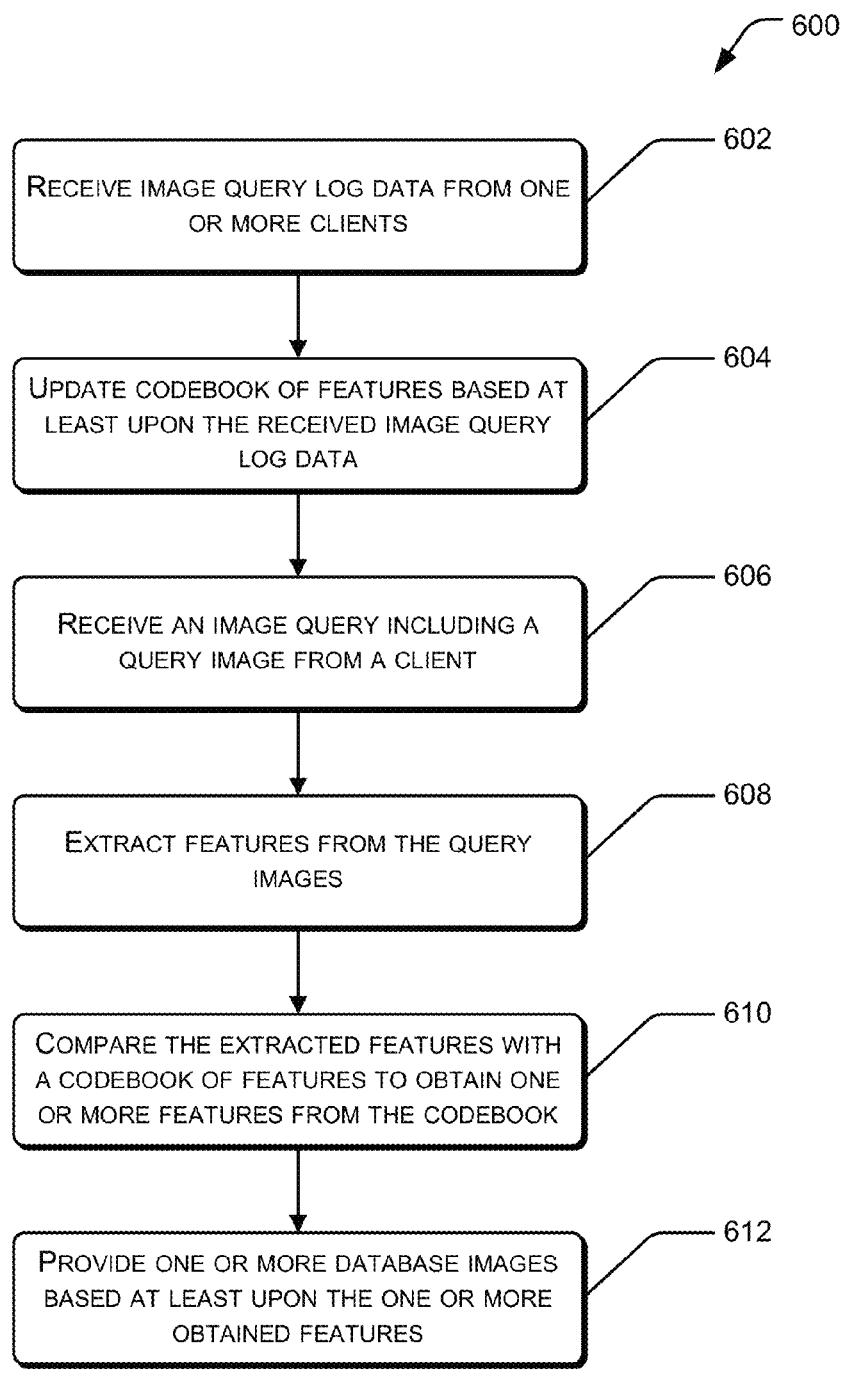
FIG. 6 illustrates a third exemplary method of retrieving one or more database images in response to an image query submitted by a client.

FIG. 6 illustrates a third exemplary method 600 of updating a codebook of features.

At block 602, image query log data is received from one or more clients. The image query log data includes at least a plurality of images that have been queried by the one or more clients within a predetermined period of time.

At block 604, a codebook of features is updated based on the received query log data.

At block 606, an image query including a query image is received from the client.

At block 608, a plurality of features are extracted from the query image using one or more feature extraction methods described in foregoing sections.

At block 610, the plurality of extracted features are compared with a codebook of features to obtain one or more features from the codebook.

At block 612, one or more database images are provided to the client based at least upon the one or more obtained features.

Any of the acts of any of the methods described herein may be implemented at least partially by a processor or other electronic device based on instructions stored on one or more computer-readable media. Computer-readable media can be any available media that can be accessed during an update of the codebook of features. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information. Combinations of any of the above should also be included within the scope of computer-readable media.

Conclusion

Although the invention has been described in language specific to structural features and/or methodological acts, it is to be understood that the invention is not necessarily limited to the specific features or acts described. Rather, the specific features and acts are disclosed as exemplary forms of implementing the invention.

What is claimed is:

1. One or more memory storage devices comprising computer-executable instructions that, when executed by one or more processors, perform acts comprising:
   receiving image query log data from one or more clients, wherein the image query log data includes an example image that a client of the one or more clients submitted as an image query to search for one or more desired images;
   extracting a plurality of features from the example image that the client submitted as an image query; and
   updating a codebook of features based at least on the plurality of features extracted from the example image that the client submitted as an image query.

2. The one or more memory storage devices as recited in claim 1, wherein the image query log data further comprises a plurality of query times corresponding to a plurality of images that have been submitted for query by the one or more clients, and wherein updating the codebook of features comprises increasing a likelihood of retrieving a feature of a first image, of the plurality of images, having a first query time relative to a feature of a second image, of the plurality of images, having a second query time which is prior to the first query time.

3. The one or more memory storage devices as recited in claim 1, the acts further comprising:
   comparing the plurality of features extracted from the example image with features in the codebook of features; and
   retrieving one or more database images from a database based at least on the comparing.

4. The one or more memory storage devices as recited in claim 3, the acts further comprising:
   providing a score for each of the one or more database images, the score representing a relative resemblance of each of the one or more database images to the example image based on the plurality of features extracted from the example image.

5. The one or more memory storage devices as recited in claim 1, wherein updating the codebook of features comprises:
   extracting multiple features from a plurality of images that have been submitted for query by the one or more clients; and
   updating weights of features of the codebook based at least on the multiple features extracted from the plurality of queried images.

6. The one or more memory storage devices as recited in claim 5, the acts further comprising:
   normalizing the updated codebook of features in response to the codebook being updated a predetermined number of times, the normalizing comprising rescaling the weights of the features of the codebook by a scale factor.

7. The one or more memory storage devices as recited in claim 5, wherein the query log data further comprises a plurality of database images that have been selected by the one or more clients within a predetermined period of time.

8. A system for image retrieval, the system comprising:
memory;
one or more processors operatively coupled to the memory;
a query receiving module stored in the memory and executable by the one or more processors to receive, from a client, an example image that the client submitted as an image query to search for one or more desired images;
a feature extraction module stored in the memory and executable by the one or more processors to extract a plurality of features from the example image that the client submitted as an image query;
a search hierarchy module stored in the memory and executable by the one or more processors to compare the plurality of extracted features with a codebook of features to obtain one or more features from the codebook of features, and provide one or more database images to the client based at least upon the one or more obtained features; and
a codebook construction module stored in the memory and executable by the one or more processors to update the codebook of features based at least upon the plurality of extracted features from the example image that the client submitted as an image query.

9. The system as recited in claim 8, wherein:
the query receiving module is further executable to receive an indication that the client selects a database image of the one or more database images; and
the codebook construction module is further executable to update the codebook of features based further on features of the selected database image.

10. The system as recited in claim 8, wherein the search hierarchy module is further executable to provide a score for each of the one or more database images, the score representing a relative resemblance of each of the one or more database images to the example image.

11. The system as recited in claim 8, wherein the codebook reconstruction module is further executable to update the codebook of features by updating weights of the features of the codebook based at least on the plurality of extracted features from the example image.

12. The system as recited in claim 11, wherein the codebook reconstruction module is further executable to normalize the codebook of features by rescaling the weights of the features of the codebook by a scale factor in response to the codebook being updated a predetermined number of times.

13. A computer-implemented method comprising:
receiving image query log data from a client, the image query log data comprising at least a plurality of images that have been submitted for query by the client within a predetermined period of time;
updating a codebook of features stored in memory based at least on the received image query log data;
receiving an example image that the client submitted as an image query to search for one or more desired images;
extracting a plurality of features from the example image that the client submitted as an image query;
comparing the plurality of features extracted from the example image with the updated codebook of features stored in the memory;
obtaining one or more features from the updated codebook of features based at least on the comparing the plurality of features extracted from the example image with the updated codebook of features stored in the memory; and
providing one or more database images to the client based at least on the one or more features obtained from the updated codebook of features.

14. The computer-implemented method as recited in claim 13, wherein the image query log data further comprises a plurality of query frequencies corresponding to the plurality of queried images, and wherein the updating comprises increasing a likelihood of retrieving a feature of a first queried image having a first query frequency relative to a feature of a second queried image having a second frequency, which is lower than the first frequency.

15. The computer-implemented method as recited in claim 13, wherein the image query log data further comprises a plurality of query times corresponding to the plurality of queried images, and wherein the updating comprises increasing a likelihood of retrieving a feature of a first queried image having a first query time relative to a feature of a second queried image having a second query time, which is prior to the first query time.

16. The computer-implemented method as recited in claim 13, wherein updating the codebook of features comprises:
extracting a plurality of features from the plurality of queried images;
updating weights of the features of the codebook based at least on the plurality of extracted features from the plurality of queried images; and
normalizing the updated codebook of features in response to the codebook being updated a predetermined number of times, the normalizing comprising rescaling the weights of the features of the codebook by a scale factor.

17. The computer-implemented method as recited in claim 13, wherein the plurality of extracted features comprise one or more of a scale-invariant feature transform (SIFT) or intensity histogram.

18. The computer-implemented method as recited in claim 13, further comprising assigning an extracted feature of the plurality of extracted features to a visual word of the codebook.

19. The computer-implemented method as recited in claim 13, further comprising:
receiving at least one keyword that describes the example image that the client submitted as the image query; and
responsive to determining that a first database image is relevant to the example image based at least in part on the comparing the plurality of extracted features with the updated codebook features stored in the memory, determining whether the first database image is tagged with the at least one keyword;
wherein, responsive to determining that the first database image is tagged with the at least one keyword, the providing one or more database images to the client includes providing the first database image in a higher ranking position than a second database image that is not tagged with the at least one keyword.

20. The one or more memory storage devices as recited in claim 1, wherein the codebook of features comprises a plurality of clusters of image features.

* * * * *